(12) United States Patent
Kamiyama et al.

(10) Patent No.: US 9,666,394 B2
(45) Date of Patent: May 30, 2017

(54) HEAT SENSOR

(71) Applicant: Calsonic Kansei Corporation, Saitama-shi (JP)

(72) Inventors: Naohisa Kamiyama, Saitama (JP); Hiroki Yoshioka, Saitama (JP)

(73) Assignee: Calsonic Kansei Corporation, Saitama-shi (JP)

( * ) Notice: Subject to any disclaimer, the term of this patent is extended or adjusted under 35 U.S.C. 154(b) by 0 days.

(21) Appl. No.: 14/759,523

(22) PCT Filed: Nov. 5, 2013

(86) PCT No.: PCT/JP2013/079820
§ 371 (c)(1),
(2) Date: Jul. 7, 2015

(87) PCT Pub. No.: WO2014/109114
PCT Pub. Date: Jul. 17, 2014

(65) Prior Publication Data
US 2015/0357138 A1 Dec. 10, 2015

(30) Foreign Application Priority Data
Jan. 10, 2013 (JP) .................................. 2013-002417

(51) Int. Cl.
*H01H 37/04* (2006.01)
*H01H 37/52* (2006.01)
(Continued)

(52) U.S. Cl.
CPC .............. *H01H 37/04* (2013.01); *G01K 5/62* (2013.01); *H01H 3/46* (2013.01); *H01H 37/34* (2013.01);
(Continued)

(58) Field of Classification Search
CPC ........ H01H 37/54; H01H 37/34; H01H 37/04; H01H 3/46; H01H 37/52; H01H 2231/026;
(Continued)

(56) References Cited

U.S. PATENT DOCUMENTS 2,703,231 A    3/1955  Ryde et al.
3,416,115 A *  12/1968 Moorhead .............. H01H 37/54
                                                  337/343
(Continued)

FOREIGN PATENT DOCUMENTS

CN         2678107 Y     2/2005
CN       201247732 Y     5/2009
(Continued)

OTHER PUBLICATIONS

International Search Report mailed Dec. 10, 2013, issued for PCT/JP2013/079820.

*Primary Examiner* — Anatoly Vortman
(74) *Attorney, Agent, or Firm* — Locke Lord LLP (57) ABSTRACT

A thermal sensor with a simple structure can secure the deformability of a bimetal, and accurately control the position of the bimetal, to increase the response speed (heat response) of the bimetal. The thermal sensor includes a bimetal, a case, and a cover member. A pressing portion is provided between the cover member and the bimetal to press the bimetal to a bottom portion of the case. The pressing portion is deformable in accordance with the deformation of the bimetal.

17 Claims, 4 Drawing Sheets

(51) Int. Cl.
*H01H 3/46* (2006.01)
*G01K 5/62* (2006.01)
*H01H 37/54* (2006.01)
*H01H 37/34* (2006.01)

(52) U.S. Cl.
CPC ............ *H01H 37/52* (2013.01); *H01H 37/54* (2013.01); *H01H 2205/002* (2013.01); *H01H 2223/008* (2013.01); *H01H 2231/026* (2013.01)

(58) Field of Classification Search
CPC ....... H01H 2205/002; H01H 2223/008; G01K 5/62
USPC .......................................................... 337/350
See application file for complete search history.

(56) References Cited

U.S. PATENT DOCUMENTS

| | | | |
|---|---|---|---|
| 3,441,897 A | | 4/1969 | Charlade |
| 4,053,859 A | * | 10/1977 | Hollweck ............ H01H 37/5409 337/348 |
| 4,317,098 A | * | 2/1982 | Colavecchio .......... H01H 37/54 337/113 |
| 4,350,967 A | * | 9/1982 | Doherty, Jr. .......... F02D 41/086 337/336 |
| 4,470,033 A | * | 9/1984 | Hofsass ............. H01H 37/5427 337/343 |
| 4,914,415 A | | 4/1990 | Cambien |
| 5,121,095 A | * | 6/1992 | Ubukata ............ H01H 37/5427 29/622 |
| 5,229,740 A | * | 7/1993 | Mizutani ............ H01H 37/5427 337/354 |
| 5,285,183 A | | 2/1994 | Asada |
| 5,615,072 A | * | 3/1997 | Hofsass ................ H01H 1/504 337/107 |
| 5,892,429 A | * | 4/1999 | Hofsass ................ H01H 1/504 337/102 |
| 5,903,210 A | * | 5/1999 | Hofsass ................ H01H 37/64 337/333 |
| 6,580,351 B2 | * | 6/2003 | Davis .................... H01H 37/54 337/111 |
| 8,847,725 B2 | * | 9/2014 | Buettner ............ H01H 37/5427 337/298 |
| 2013/0021132 A1 | * | 1/2013 | Kandhasamy ......... H01H 37/74 337/333 |
| 2013/0057381 A1 | * | 3/2013 | Kandhasamy ..... H01H 37/5409 337/348 |
| 2013/0271258 A1 | * | 10/2013 | Hofsaess ................ H01H 37/64 337/298 |

FOREIGN PATENT DOCUMENTS

| | | |
|---|---|---|
| CN | 201773768 U | 3/2011 |
| JP | 48-24997 A | 7/1973 |
| JP | 54-47079 U | 4/1979 |
| JP | 59-91650 U | 6/1984 |
| JP | 1-502790 A | 9/1989 |
| JP | 05-314876 A | 11/1993 |
| JP | 2005-322424 A | 11/2005 |
| JP | 2009-231074 A | 10/2009 |

* cited by examiner

HEAT SENSOR

CROSS-REFERENCE TO RELATED APPLICATION

The present application is based on and claims priority from Japanese Patent Application No. 2013-2417, filed on Jan. 10, 2013, the disclosure of which is hereby incorporated by reference in its entirety.

TECHNICAL FIELD

The present invention relates to a thermal sensor of a simple structure which can secure the deformability of a bimetal and position the bimetal accurately to thereby improve the response speed (thermal responsiveness) of the bimetal.

BACKGROUND ART

It is well known that a thermal sensor such as a thermal switch is used in a heat generating device as an electric heater. The thermal sensor works as a safety device to sense a temperature increase exceeding a certain temperature to stop the operation of a heat generating device or generate an anomaly detecting signal, for example.

Such a thermal sensor uses a thermally deformable bimetal inside (see Patent Literature 1, for example).

The thermal sensor includes a case with an aperture and a cover member occluding the aperture, in which the edge or periphery of the bimetal is placed in-between the case and the cover member to hold the bimetal, for example.

CITATION LIST

Patent Literature

Patent Literature 1: Japanese Laid-open Patent Application Publication No. 2009-231074

SUMMARY

Technical Problem

However, for holding the bimetal by placing the edge of the bimetal in-between the case and the cover member, it is needed to precisely adjust a clearance between the edge of the bimetal and the inner surface of the case.

For example, with a narrow clearance set to accurately position the bimetal, the bimetal may not be inverted properly since the edge of the bimetal interferes with the inner surface of the case.

Meanwhile, with a wide clearance set, the bimetal can be inverted but it cannot be accurately positioned. Therefore, a variation in the position of the bimetal causes a variation in response speed. Further, the bimetal may be moved inside the case, generating noise or causing abrasion.

Accurately adjusting a subtle and fine clearance between the edge of the bimetal and the inner surface of the case is the most important factor to improve the quality and performance of the thermal sensor. Because of a manufacturing error, it is more difficult to exactly adjust the clearance than expected, causing a variation in the quality and performance of the thermal sensor.

Solution to Problem

In view of solving the above problem, the present invention aims to provide a thermal sensor which includes a thermally deformable bimetal, a case which accommodates the bimetal and transfers external heat to the bimetal, a cover member which occludes an aperture of the case into which the bimetal is inserted, and a pressing holder provided between the cover member and the bimetal to press the bimetal to a bottom portion of the case, wherein the pressing holder is deformable in accordance with a deformation of the bimetal.

Advantageous Effects

The present invention as configured above can attain the following effects.

The pressing holder is interposed between the cover member and the bimetal and functions to press the bimetal to the bottom portion of the case. Thereby, the bimetal contacts the bottom portion of the case at a necessary pressing force and a required surface pressure to reduce contact heat resistance occurs between the bimetal and the bottom portion of the case. Because of this, heat from an external thermal source can be securely and efficiently transferred to the bimetal via the bottom portion of the case. Accordingly, the response speed (thermal responsiveness) of the bimetal can be increased. Then, the pressing holder is forced to be elastically deformed by the deforming force of the bimetal. Thereby, the bimetal can be certainly deformed against the pressing force of the pressing holder. Thus, the deformability of the bimetal can be secured.

DESCRIPTION OF EMBODIMENTS

Hereinafter, one embodiment and examples will be described referring to the accompanying drawings. FIG. 1 to FIG. 8 show the present embodiment and its examples.

First Example

Structure

Figure 1:
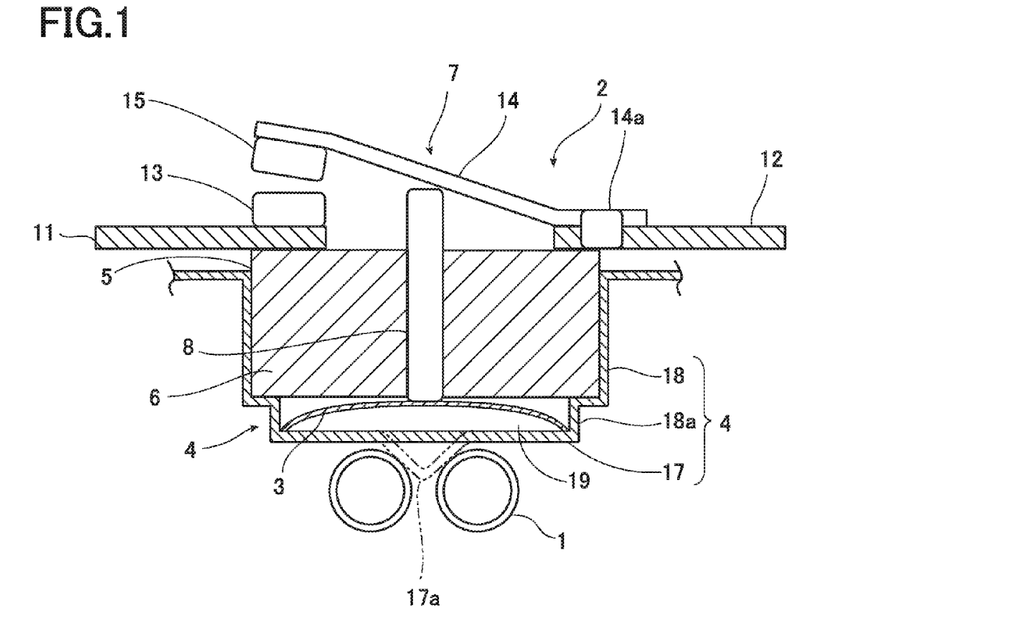
FIG. 1 is an entire vertical cross section view (open state) of a basic thermal sensor according to an example recited in one embodiment.
Figure 2:
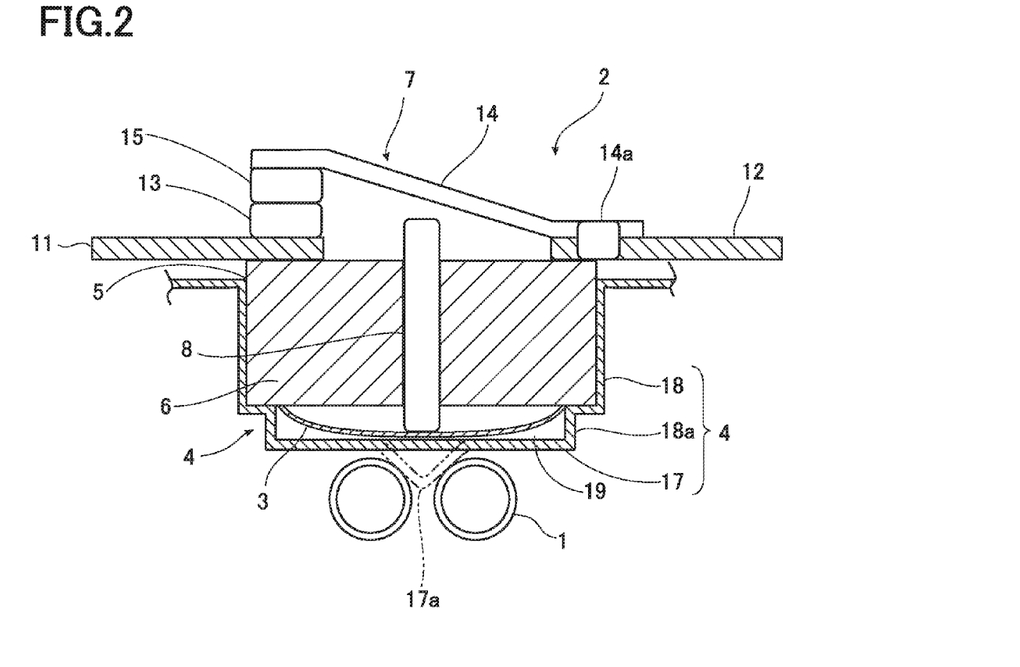
FIG. 2 is an entire vertical cross section view (closed state) of the thermal sensor as in FIG. 1.

The structure of a thermal sensor will be described in the following. Referring to FIGS. 1 and 2, a thermal sensor 2 as a thermal switch is used as a safety device to sense a temperature increase of a thermal source 1 as a heat generating device to a certain temperature or more to stop the operation of the heat generating device and generate an anomaly detecting signal, for example. The thermal sensor 2 includes a thermally deformable bimetal 3, a case 4 accommodating the bimetal 3 to transfer external heat to the bimetal 3, a cover member 6 to occlude an aperture 5 of the case 4 into which the bimetal 3 is inserted.

(Supplemental Explanation)

The thermal source 1 as a heat generating device is assumed to be an electric heater used for heating refrigerant in a water heater of an air conditioner of an electric vehicle. However, the thermal source 1 is not limited thereto.

The thermal sensor 2 is literally a device for sensing heat and can further include a switch 7 and a manipulation rod 8 or rod integrally provided to be moved by a deformation of the bimetal 3 to open or close (turn on or off) the switch 7. The bimetal 3 and the manipulation rod 8 form a switch driving mechanism to automatically operate the switch 7. In the drawings the thermal sensor 2 is placed above the heat generating device (thermal source 1) with the manipulation rod 8 oriented vertically and movable vertically. However, the position and direction where the thermal sensor 2 is placed and the moving direction thereof are not limited thereto. In this example a description is made on the manipulation rod 8 oriented vertically.

The switch 7 includes, for example, a pair of terminal boards 11, 12 secured on the outer surface or top surface of the cover member 6 in the drawings, a static contact 13 provided on one of the pair, terminal board 11, and a moving contact 15 provided on the other of the pair, terminal board 12 via a moving plate 14.

The terminal board pair 11, 12 are arranged and secured on a straight line at the end of the outer surface of the cover member 6 along the diameter of the cover member 6. The static contact 13 is provided on the inner end of the top surface of the terminal board 11. The base end of the moving plate 14 is secured on the inner end of the top surface of the terminal board 12 with a swage or the like (swage 14a). The moving plate 14 is a short strip extending toward the static contact 13 along the diameter of the cover member 6. A tip end of the moving plate is appropriately bent in an off-plane direction of the cover member 6, for example, upward in the drawing, to move away from the static contact 13. The moving contact 15 is attached onto the end surface of the moving plate 14 on a static contact 13 side, to be separated from the static contact 13. The moving contact forms the switch 7. The terminal board pair 11, 12, static contact 13, moving plate 14 and moving contact 15 of the switch 7 each have conductivity.

Further, the manipulation rod 8 extends along the axial line of the case 4 and the cover member 6 or along the thickness of the cover member 6 through the center of the case 4 or cover member 6. The manipulation rod 8 is non-conductive. The manipulation rod 8 is movable along the axis at the center of the cover member 6, that is, penetrates through the center to freely move upward and downward. The cover member 6 includes a guiding hole 16 (FIG. 3) at the center for guiding the motion of the manipulation rod 8. The inner diameter of the guiding hole 16 is set to be approximately equal to or slightly larger than the outer diameter of the manipulation rod 8.

The position of the manipulation rod 8 is set so that the switch 7 is generally in an OFF or open state and placed in an ON or closed state when operated. However, the structure of the switch driving mechanism can be modified such that the switch 7 is generally in an ON or closed state and placed in an OFF or open state when operated.

The bimetal 3 is formed of metal plates with different thermal expansion coefficients adhered to each other and deformed due to a difference in extension by heat.

Figure 3:
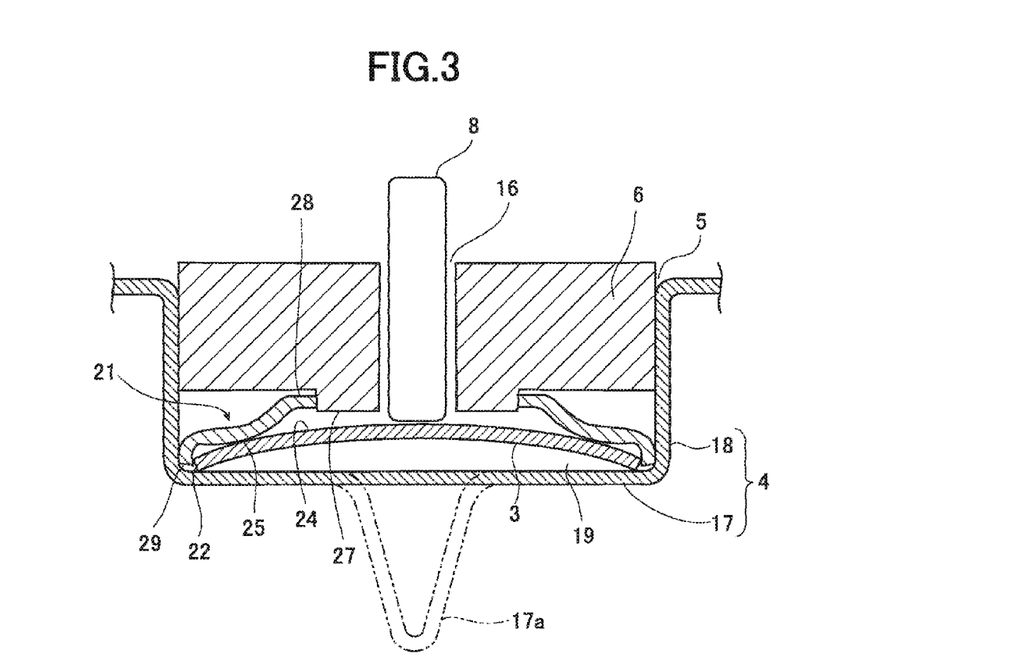
FIG. 3 is a partially enlarged view of the thermal sensor in FIG. 1 according to a first example.

As shown in FIG. 3, the case 4 is a bottomed container having a bottom portion 17 or bottom surface, side portions 18 or side surfaces, and an aperture 5 on a top surface. The bottom portion 17 is a heat receiving surface relative to the heat generating device (thermal source 1). The light receiving surface can be flat or include a portion to increase a heat receiving area, for instance, a protrusion 17a indicated by a virtual line. The shape of the protrusion 17a is set in accordance with the shape of the heat generating device (thermal source 1).

The case 4 is made from metal for the purpose of efficiently transferring heat from the thermal source 1 outside. Herein, the case 4 is a columnar container. Alternatively, it can be a square-tube shape or another shape container.

The aperture 5 is formed in the top portion or plane of the case 4 opposite to the heat receiving surface of the bottom portion 17. The aperture 5 is of a circular shape and a size corresponding to those of the top ends of the side portions 18 of the case 4. The shape of the aperture 5 should not be limited to a circular shape and can be a shape in line with a square-tube or different shape of the case 4.

The cover member 6 is literally for occluding the aperture 5 and made from resin. The shape and size of the cover member 6 are the same as those of the aperture 5 and it has a necessary thickness to fit into the aperture 5. Further, a step 18a for decreasing the diameter of the bottom portion 17 can be provided on the side portion 18 of the case 4 to secure a bimetal space 19 in which the bimetal is accommodated and define this space in a certain size, as shown in FIG. 1. The cover member 6 can be securely supported on the top surface of the step 18a in the drawing.

In addition to the above basic elements, the following elements are also provided in the present example.

First Embodiment

Figure 4:
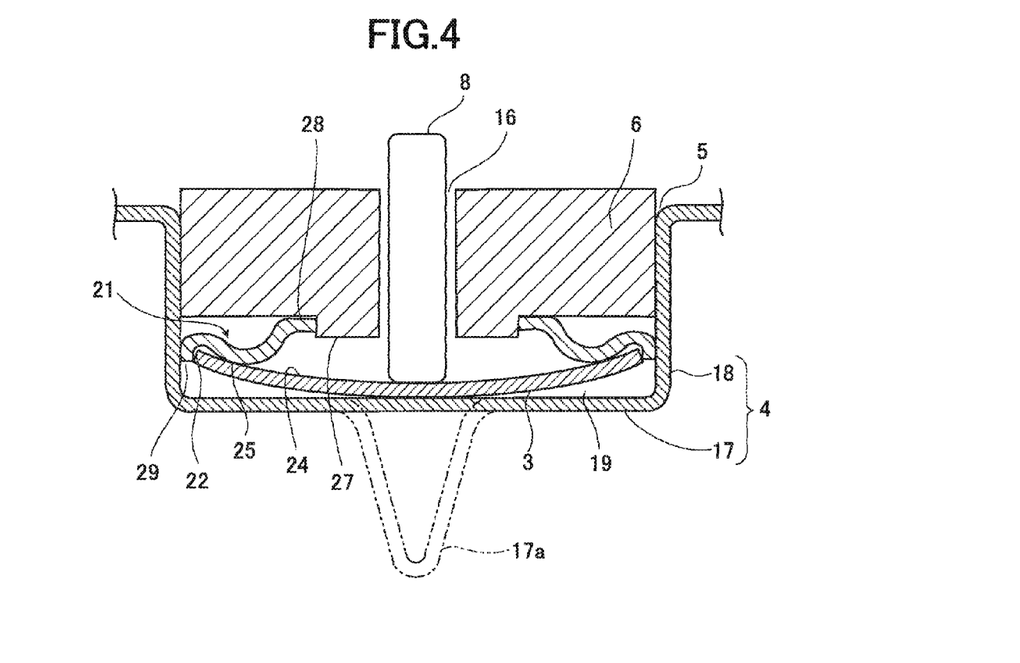
FIG. 4 is a partially enlarged view of the thermal sensor in FIG. 2 according to the first example.

Referring to the first example in FIGS. 3 and 4, a pressing holder 21 is provided between the cover member 6 and the bimetal 3 to press the bimetal 3 toward the bottom portion 17 of the case 4. The pressing holder 21 is deformable in accordance with the deformation of the bimetal 3.

Herein, the pressing holder 21 is intended for holding the bimetal 3 while pressing it to the heat receiving surface of the bottom portion 17. The details of the pressing holder 21 will be described later.

The pressing holder 21 deformable in accordance with the deformation of the bimetal 3 means that the pressing holder 21 is elastically deformed by the deformation of the bimetal 3. The pressing holder 21 continuously holds the bimetal with pressure while accumulating or releasing an elastic force. Preferably, the pressing holder 21 is deformed into a shape matching the shape of a deformed bimetal 3.

Second Embodiment

As described above, the thermal sensor 2 further includes the manipulation rod 8 which moves along with the deformation of the bimetal 3 and the switch 7 which turns on or off by the motion of the manipulation rod 8. The pressing holder 21 and the manipulation rod 8 are made of different members.

Herein, the different members mean that the pressing holder 21 and the manipulation rod 8 are separate parts and are able to independently move or deform.

Third Embodiment

Figure 6:
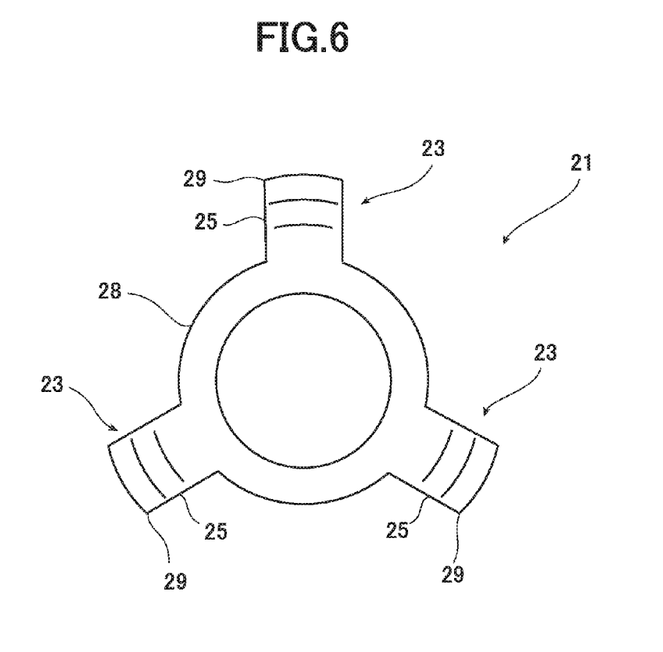
FIG. 6 is a plan view of a pressing holder in FIG. 3.

As shown in FIGS. 3 and 6, the pressing holder 21 includes a given number of legs 23 extending to the edge 22 of the bimetal 3 from the cover member 6. The legs 23 each have a pressing portion 25 which touches a cover-member-side surface 24 of the bimetal 3 adjacent to the edge 22 to directly press the edge 22 of the bimetal 3 toward the bottom portion 17 of the case 4.

Herein, the legs 23 are literally members of a leg shape.

The expression, "adjacent to the edge 22 of the bimetal 3" literally refers to the periphery of the edge 22 of the bimetal 3, that is, a pressing position or a position in a pressing area in which the deformability of the bimetal can be secured.

Preferably, the legs 23 are configured to contact the cover-member-side surface 24, that is, the top surface in FIG. 3 in an approximately point-contact or line-contact manner. In other words they are configured to partially contact the bimetal 3 in a pressing position or a position in a pressing area in which the deformability of the bimetal 3 can be secured.

The pressing portions 25 are of a U-shape or V-shape as seen laterally, protruding to the cover-member-side surface 24 of the bimetal 3, for example, downward in FIG. 3. The laterally U-shape or V-shape pressing portions 25 have elastic force required to press the bimetal 3. Thus, the top or the periphery of the top of the U-shape or V-shape pressing portions 25 approximately linearly contacts the cover-member-side surface 24 of the bimetal 3.

Fourth Embodiment

The bimetal 3 is of a concaved or convexed disc shape. Referring to FIG. 6, the legs 23 are provided to be able to equally press the circumference or edge 22 of the disc-shape bimetal 3 at three or more locations.

Herein, the concaved or convexed disc shape means that the bimetal is generally an upward convex shape as shown in FIG. 3 and it is deformed and inverted to a downward convex when operated as shown in FIG. 4. Alternatively, it can have a downward convex shape in general and be deformed to an upward convex when operated.

The legs 23 are provided with a necessary equal gap in a circumferential direction. In this example three legs are provided with a 120-degree gap. Alternatively, four legs can be provided with a 90-degree gap or four or more legs can be equally provided with a necessary gap in a circumferential direction, for example.

The word, "equal" refers to both equal circumferential position and the equal pressing force of the respective legs 23, and can include few error.

Meanwhile, with use of a bimetal of a non-disc shape, for instance, the legs 23 are not needed to equally press the three or more locations in the circumferential direction. Needless to say that the number and positions of the legs can be arbitrarily changed in accordance with the shape of the bimetal 3.

Fifth Embodiment

The cover member 6 includes a protrusion 27 on a surface (bottom surface) close to the bimetal 3, as shown in FIGS. 3 and 4. The pressing holder 21 includes a cover engaging portion 28 to be able to be engaged with the protrusion 27 and edge abutters 29 to be able to abut on the edge 22 of the bimetal 3.

Herein, the protrusion 27 literally protrudes from the cover member 6 and is integrally provided with the cover member 6. The protrusion 27 can be arbitrarily shaped, however, it is preferable that the protrusion 27 be concentrically provided in the center of the cover member 6, for the purpose of equally pressing or holding the bimetal with the legs 23. The protrusion 27 is of a columnar shape. A protrusion amount of the protrusion 27 is set to be approximately equal to or slightly larger than the thickness of the cover engaging portion 28 to easily engage with the cover engaging portion 28 and avoid an unnecessarily large size of the protrusion 27. However, the shape of the protrusion 27 should not be limited to a columnar shape and it can be another shape such as a rectangular column.

The cover engaging portion 28 is formed in a ring-like shape, having a surface approximately parallel to the bimetal-side surface of the cover member 6 or the bottom surface excluding the protrusion 27 in FIG. 3, for example, to be able to fit onto the protrusion 27. The diameter of the inner circumference of the ring-like cover engaging portion 28 is set to be approximately equal to that of the outer circumference of the protrusion 27. The cover engaging portion 28 can control the position of the pressing holder 21 along the radius of the cover member 6, for example.

Preferably, the cover engaging portion 28 is configured to point-contact or linearly contact the protrusion 27 or the cover member 6. The top surface of the cover engaging portion 28 can contact the bimetal-side surface of the cover member 6 by the width of the cover engaging portion 28. Further, it is preferable that the width of the cover engaging portion 28 be as narrow as possible. The inner circumference of the cover engaging portion 28 can linearly contact the outer circumference of the protrusion 27. Thus, a reduced area of the cover engaging portion 28 contacts the cover member 6.

The edge 22 of the bimetal 3 refers to an end or end face, or an edge end of the bimetal 3.

The edge abutters 29 literally abut on the edge 22 and an end or end face of the bimetal 3 and are engaged with the bimetal 3 in an approximately radial direction. Preferably, the edge abutters 29 linearly contact or point-contact the edge 22 of the bimetal 3. The edge abutters 29 are of a claw shape formed by bending the tip ends of the legs 23 to the bottom portion 17 of the case 4 by an amount corresponding to the thickness of the bimetal 3.

Thereby, the pressing holder 21 has a complex shape including the legs 23 arranged with an equal gap to protrude to the radial direction of the bimetal 3 from the outer edge of the ring-like cover engaging portion 28 as well as the pressing portion 25 and the edge abutter 29 formed in each of the legs 23, as shown in FIG. 6. The pressing holder 21 is formed by press molding of a single metal plate, for instance, and functions as a spring member (metal spring).

Sixth Embodiment

Figure 7:
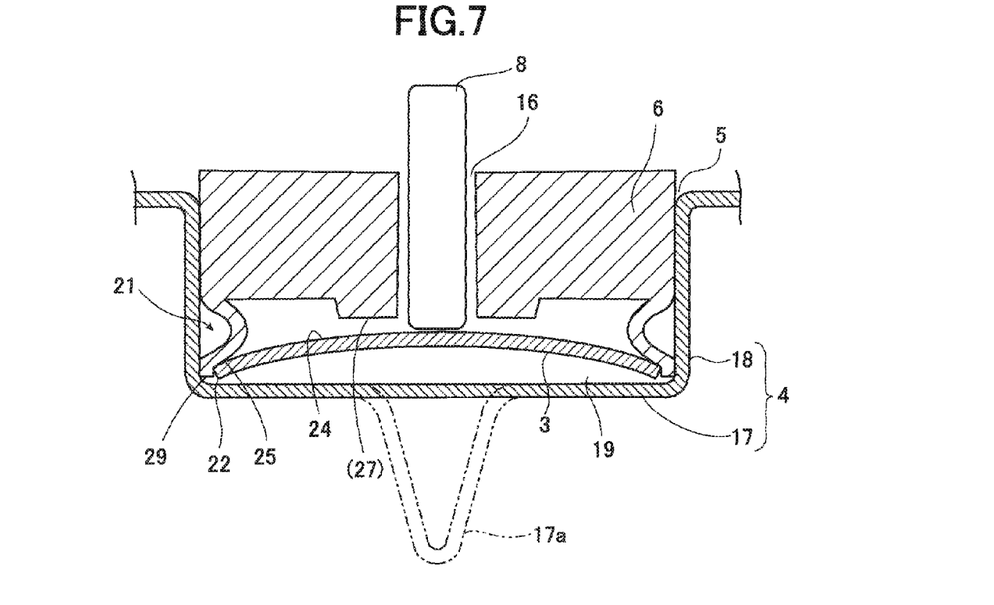
FIG. 7 is a partially enlarged view of the thermal sensor in FIG. 1 according to a second example.
Figure 8:
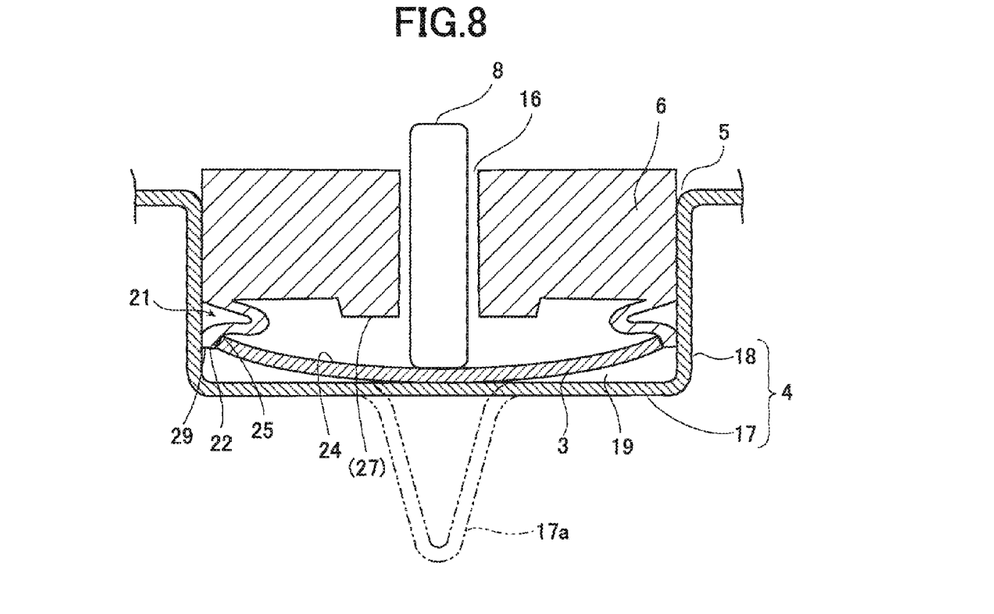
FIG. 8 is a partially enlarged view of the thermal sensor in FIG. 2 according to the second example.

Alternatively, the pressing holder 21 can be made from a material with a lower heat transfer coefficient than that of the bimetal 3, as shown in a second example of FIG. 7 and FIG. 8.

Further, the material with a lower heat transfer coefficient can be resin, for instance. Then, the pressing holder 21 made from resin can be integrally formed with the resin cover member 6. This can reduce the number of parts and costs and improve the response speed or thermal responsiveness of the bimetal 3. Similarly to the first example, the pressing holder 21 is the legs 23 integrally extending from the edge of the bottom surface, that is, bimetal-side surface of the cover member 6 in FIG. 7, for example. The legs 23 are circumferentially provided at three or more locations. Thus, by integrally forming the cover member 6 and the legs 23, the pressing holder 21 can securely function to control the position of the cover member 6 and improve the position controlling performance relative to the bimetal 3 accordingly.

The legs 23 each include a U-shaped bending portion as seen laterally, protruding to the manipulation rod 8 or the inside of the case 4. A lower part of the bending portion forms the pressing portion 25 which presses the cover-member-side surface 24 of the edge 22 of the bimetal 3. The pressing portion 25 is, for example, a resin spring configured to have a required elastic force to press the bimetal 3. Also, the pressing portion 25 approximately linearly contacts the surface of the bimetal 3 on the cover member 6 side. Further, the legs 23 can each include the edge abutter 29 at the tip end. Thus, the edge abutters 29 of the legs 23 abut on the edge 22 or edge end of the bimetal 3 to be able to accurately position the bimetal 3 relative to the cover member 6 via the pressing holder 21 integrated with the cover member 6.

Seventh Embodiment

The pressing holder 21 is configured to press the bimetal 3 with a smaller force than the deforming force of the bimetal 3.

Figure 5:
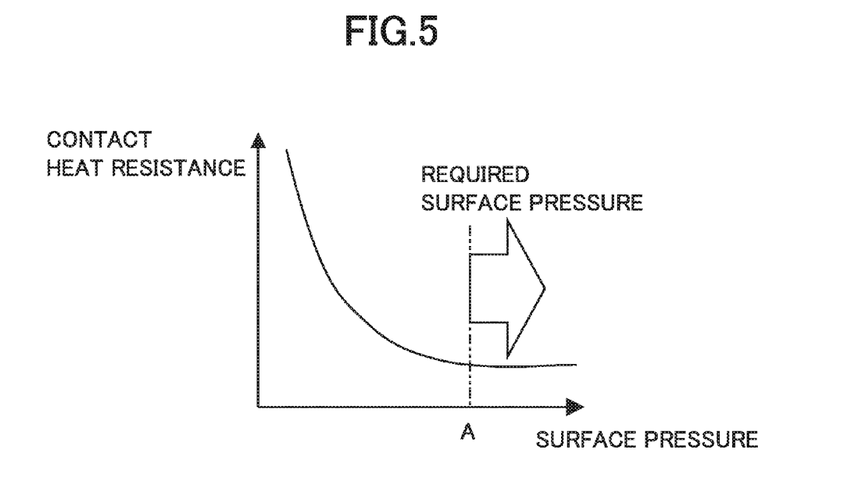
FIG. 5 is a graph showing a relationship between contact heat resistance and surface pressure.

The smaller force than the deforming force of the bimetal 3 refers to a pressing force intentionally set to be smaller than a deforming or inversing force of the bimetal 3. However, the pressing force of the pressing holder 21 is set to be larger than a force to obtain a required surface pressure A at point A shown in the graph in FIG. 5. FIG. 5 shows a relationship between contact heat resistance and surface pressure. It is seen from the graph in FIG. 5 that contact heat resistance and surface pressure are approximately inversely proportional to each other. The required surface pressure A is one at which contact heat resistance between the bimetal 3 and the bottom portion 17 of the case 4 takes a minimal value or a substantively approximate value to a minimal value.

Eighth Embodiment

The thermal sensor 2 includes the bimetal 3 of a concaved or convexed disc shape thermally deformable, the case 4 which accommodates the bimetal 3 and transfers external heat to the bimetal 3, the cover member 6 which occludes the aperture 5 of the case 4 into which the bimetal 3 is inserted, the manipulation rod 8 to contact the central portion of the bimetal 3 and move along with the deformation of the bimetal 3, the switch 7 to turn on or off in accordance with the motion of the rod 8, and the pressing holder 21 provided between the cover member 6 and the bimetal 3 to press the bimetal 3 toward the bottom portion 17 of the case 4. The pressing holder 21 includes the legs 23 extending to the edge 22 of the bimetal 3 from the cover member 6 to be deformable along with the deformation of the bimetal 3. The legs 23 each include the pressing portion 25 to contact the cover-member-side surface 24 of the bimetal 3 in the vicinity of the edge 22 and directly press the edge 22 to the bottom portion 17 of the case 4. Moreover, the legs 23 are provided to be able to equally press the three or more circumferential locations on the edge 22 of the disc-shaped bimetal 3.

<Operation>

In the following the operation of the present embodiment will be described. The bimetal 3 is inserted in the case 4 from the aperture 5 and the aperture 5 is occluded with the cover member 6 via the pressing holder 21. Thereby, the bimetal 3 is supported by the pressing holder 21 inside the case 4. Then, the case 4 is placed with the bottom portion 17 directed at or directly contacting the external thermal source 1. Thus, the thermal sensor 2 can be activated by heat generated from the external thermal source 1.

The heat from the external thermal source 1 is transferred to the bimetal 3 in the case 4 via the bottom portion 17 of the case 4. When reaching a certain temperature by the heat from the external thermal source 1, the bimetal 3 is deformed. Abnormal temperature increase can be detected from the deformation of the bimetal 3. Further, the manipulation rod 8 is moved by the deformation of the bimetal 3 to change the switch 7 from the open state to the closed state. Thereby, it is possible to generate an anomaly detecting signal or block power supply to the thermal source 1.

<Effects>

The present embodiment can achieve the following effects.

(Effect 1)

The pressing holder 21 interposed between the cover member 6 and the bimetal 3 functions to press the bimetal 3 to the bottom portion 17 of the case 4. The bimetal 3 thereby contacts or is pressed onto the bottom portion 17 of the case 4 at a required pressing force. A surface pressure necessary to reduce contact heat resistance is attained between the bimetal 3 and the bottom portion 17 of the case 4. This makes it possible to securely and efficiently transfer heat from the external thermal source 1 to the bimetal 3 via the bottom portion 17 of the case 4. Accordingly, the response speed or thermal responsiveness of the bimetal 3 can be enhanced.

Furthermore, by pressing the bimetal 3 to the bottom portion 17 of the case 4 with the pressing holder 21, the position of the bimetal 3 can be controlled mainly in the pressing direction in the case 4 and prevented from moving. Thus, the occurrence of noise and abrasion can be prevented.

The pressing holder 21 is elastically deformed by the deforming force of the bimetal 3 enforcedly in an opposite direction to the pressing direction.

Thereby, the bimetal 3 can be certainly deformed against the pressing force of the pressing holder 21. That is, the deformability of the bimetal can be secured.

Meanwhile, while elastically deformed by the deformation of the bimetal 3 enforcedly, the pressing holder 21 continues to press the bimetal 3 to the bottom portion 17 of the case 4. Therefore, the support of the pressing holder 21 can be maintained irrespective of the deformation of the bimetal 3. In other words the required surface pressure is retained before and after the deformation of the bimetal 3. Accordingly, the response speed of the bimetal 3 is constantly retained and stabilized. Moreover, even with some variation in the position of the bimetal 3, a variation in the response speed can be prevented.

Pressed with the pressing holder 21 to the bottom portion 17 of the case 4, the bimetal 3 is supported and positioned in the case 4. Thus, it is made possible to secure the deformability of the bimetal 3 as well as to accurately control the position of the bimetal 3 irrespective of the clearance between the edge 22 of the bimetal 3 and the inner surface of the case 4, as described above. Accordingly, it is possible to resolve the problems that the bimetal 3 is interfered with the inner surface of the case 4 and hindered from deforming and that the response speed of the bimetal 3 is varied because of a variation in the position of the bimetal 3, for example.

As a result, it is made possible to eliminate the necessity to precisely adjust the clearance between the edge 22 of the bimetal 3 and the inner surface of the case 4 while removing an error, for example, when the edge 22 of the bimetal 3 is inserted between the case 4 and the cover member 6. This results in simplifying the structure of the thermal sensor, facilitating the manufacturing thereof, and improving the quality and performance of a product.

(Effect 2)

The pressing holder 21 and the manipulation rod 8 are made of different members and are separate parts to be independently deformable or movable. This makes it possible for the pressing holder 21 to freely follow the deformation of the bimetal 3.

(Effect 3)

The legs 23 of the pressing holder 21 extending to the edge 22 of the bimetal 3 from the cover member 6 can directly and partially press the cover-member-side surface 24 of the bimetal 3 to the bottom portion 17 of the case 4 at a given number of locations near the edge 22. Thereby, in comparison with a structure that the entire circumference of the edge 22 of the bimetal 3 is inserted between the case 4 and the cover member 6, a contact area of the pressing holder 21 and the bimetal 3 can be greatly reduced. This can reduce heat transfer to the pressing holder 21 and improve the response speed of the bimetal 3 accordingly.

Further, the pressing portions 25 of the legs 23 can contact the cover-member-side surface 24 of the bimetal 3 near the edge 22 and directly press the edge 22 of the bimetal 3 to the bottom portion 17 of the case 4. Thereby, the bimetal 3 can be effectively held although the contact area is reduced, and the position thereof can be effectively controlled.

(Effect 4)

The concaved or convexed disc shape of the bimetal 3 is an optimal shape for equally pressing the bimetal 3 with the legs 23.

Moreover, the legs 23 are provided to be able to equally press three or more circumferential locations of the edge 22 of the disc-shaped bimetal 3. Thereby, the bimetal 3 can be more securely and stably supported in the case 4.

Thus, the response speed can be stabilized, further improving the quality and performance of a product.

(Effect 5)

The cover engaging portion 28 of the pressing holder 21 is engaged with the protrusion 27 on the bimetal-side surface of the cover member 6. Thereby, the pressing holder 21 can be positioned accurately relative to the cover member 6.

Further, the edge abutters 29 of the pressing holder 21 abut on the edge 22 of the bimetal 3. Thereby, the bimetal 3 can be positioned accurately relative to the cover member 6 via the pressing holder 21.

(Effect 6)

The pressing holder 21 is made from a selected material suitable for reducing heat transfer from the bimetal 3 to the pressing holder 21, thereby improving the response speed of the bimetal 3 or preventing a decrease in the response speed of the bimetal 3.

In particular the pressing holder 21 is made of the resin legs 23 integrally extending from the resin cover member 6. This can reduce the number of parts as well as enhancing the position control over the bimetal 3 relative to the cover member 6.

(Effect 7)

The pressing holder 21 is configured to press the bimetal 3 to the bottom portion 17 of the case 4 with a force smaller than the deforming force of the bimetal 3. Thereby, the pressing holder 21 can be elastically deformed enforcedly by the deforming force of the bimetal 3 in an opposite direction to the direction of the pressing force.

(Effect 8)

The above structure 8 can attain the similar effects to the effects 1 to 7.

Although the present invention has been described in terms of exemplary embodiments, it is not limited thereto. It should be appreciated that variations or modifications may be made in the embodiments described by persons skilled in the art without departing from the scope of the present invention as defined by the following claims. For instance, if each embodiment includes a number of configurations, a combination of the configurations is construed to be embodied in the present invention without an explicit description. Further, if a number of embodiments and modified examples of the present invention are disclosed, possible combinations thereof are construed to be embodied in the present invention without an explicit description. The structures shown in the drawings are also construed to be embodied in the present invention without an explicit description. Moreover, the term, "or the like" refers to the inclusion of an equivalent. The terms, "approximately", "about", and "degree" refer to the inclusion of a range or an accuracy which is commonly admitted.

REFERENCE SIGNS LIST 2 thermal sensor
3 bimetal
4 case
5 aperture
6 cover member
7 switch
8 manipulation rod
17 bottom portion
21 pressing holder
22 edge
23 leg
24 cover-member-side surface of bimetal
25 pressing portion
27 protrusion
28 cover engaging portion
29 edge abutter

The invention claimed is:

1. A thermal sensor comprising:
a thermally deformable bimetal in one direction;
a case which accommodates the bimetal and transfers external heat to the bimetal;
a cover member which occludes an aperture of the case into which the bimetal is inserted; and
a pressing holder provided between the cover member and the bimetal to press the bimetal in the opposite direction to the one direction, wherein
the pressing holder includes a number of legs extending to an edge of the bimetal from the cover member; and
the legs each include a pressing portion which contacts a cover-member-side surface of the bimetal adjacent to the edge and directly presses the edge of the bimetal in the opposite direction.

2. The thermal sensor according to claim 1, further comprising:
a manipulation rod which moves along with the deformation of the bimetal;
a switch which turns on or off in accordance with a motion of the manipulation rod, wherein the pressing holder and the manipulation rod are different components.

3. The thermal sensor according to claim 1, wherein
the bimetal is of a concaved or convexed disc shape; and
the legs are provided to equally press three or more circumferential locations of the edge of the disc-shaped bimetal.

4. The thermal sensor according to claim 1, wherein
the cover member includes a protrusion on a bimetal-side surface; and
the pressing holder includes a cover engaging portion which engages with the protrusion and an edge abutter which abuts on the edge of the bimetal.

5. The thermal sensor according to claim 1, wherein
the pressing holder is made from a material with a heat transfer coefficient lower than a heat transfer coefficient of the bimetal.

6. The thermal sensor according to claim 1, wherein
the pressing holder presses the bimetal with a force smaller than a deforming force of the bimetal.

7. The thermal sensor according to claim 2, wherein
the cover member includes a protrusion on a bimetal-side surface; and
the pressing holder includes a cover engaging portion which engages with the protrusion and an edge abutter which abuts on the edge of the bimetal.

8. The thermal sensor according to claim 3, wherein
the cover member includes a protrusion on a bimetal-side surface; and
the pressing holder includes a cover engaging portion which engages with the protrusion and an edge abutter which abuts on the edge of the bimetal.

9. The thermal sensor according to claim 2, wherein
the pressing holder is made from a material with a heat transfer coefficient lower than a heat transfer coefficient of the bimetal.

10. The thermal sensor according to claim 3, wherein
the pressing holder is made from a material with a heat transfer coefficient lower than a heat transfer coefficient of the bimetal.

11. The thermal sensor according to claim 4, wherein
the pressing holder is made from a material with a heat transfer coefficient lower than a heat transfer coefficient of the bimetal.

12. The thermal sensor according to claim 2, wherein
the pressing holder presses the bimetal with a force smaller than a deforming force of the bimetal.

13. The thermal sensor according to claim 3, wherein
the pressing holder presses the bimetal with a force smaller than a deforming force of the bimetal.

14. A thermal sensor comprising:
a thermally deformable bimetal in one direction and having a concaved or convexed disc shape;
a case which accommodates the bimetal and transfers external heat to the bimetal;
a cover member which occludes an aperture of the case into which the bimetal is inserted;
a manipulation rod which contacts a central portion of the bimetal and moves along with the deformation of the bimetal;
a switch which turns on or off in accordance with a motion of the manipulation rod and
a pressing holder provided between the cover member and the bimetal to press the bimetal in the opposite direction to the one direction, wherein
the pressing holder includes a number of legs extending to an edge of the bimetal from the cover member and deforming in accordance with a deformation of the bimetal;
the legs each include a pressing portion which contacts a cover-member-side surface of the bimetal adjacent to the edge and directly presses the edge of the bimetal in the opposite direction; and
the legs are provided to equally press three or more circumferential locations of the edge of the disc-shaped bimetal.

15. The thermal sensor according to claim 14, wherein
the cover member includes a protrusion on a bimetal-side surface; and
the pressing holder includes a cover engaging portion which engages with the protrusion and an edge abutter which abuts on the edge of the bimetal.

16. The thermal sensor according to claim 14, wherein
the pressing holder is made from a material with a heat transfer coefficient lower than a heat transfer coefficient of the bimetal.

17. The thermal sensor according to claim 14, wherein
the pressing holder presses the bimetal with a force smaller than a deforming force of the bimetal.

* * * * *